United States Patent
Wilczynski

(10) Patent No.: US 11,004,065 B2
(45) Date of Patent: *May 11, 2021

(54) ATTRIBUTE-BASED CARD COMBINATIONS FOR DIGITAL WALLETS

(71) Applicant: PAYPAL, INC., San Jose, CA (US)

(72) Inventor: Matthew Alexander Wilczynski, Austin, TX (US)

(73) Assignee: PayPal, Inc., San Jose, CA (US)

(*) Notice: Subject to any disclaimer, the term of this patent is extended or adjusted under 35 U.S.C. 154(b) by 88 days.

This patent is subject to a terminal disclaimer.

(21) Appl. No.: 16/438,263

(22) Filed: Jun. 11, 2019

(65) Prior Publication Data

US 2020/0065798 A1 Feb. 27, 2020

Related U.S. Application Data

(63) Continuation of application No. 14/581,642, filed on Dec. 23, 2014, now Pat. No. 10,318,955.

(51) Int. Cl.
  *G06Q 30/00* (2012.01)
  *G06Q 20/36* (2012.01)
(52) U.S. Cl.
  CPC .................................. *G06Q 20/36* (2013.01)
(58) Field of Classification Search
  CPC ..................................................... G06Q 20/36
  USPC ......... 705/41, 1.1, 32, 44, 38, 14.17, 69, 36; 348/64; 235/470, 488
  See application file for complete search history.

(56) References Cited

U.S. PATENT DOCUMENTS

| | | | |
|---|---|---|---|
| 7,792,748 B1* | 9/2010 | Ebersole | G06Q 20/10 705/39 |
| 2004/0249753 A1 | 12/2004 | Blinn et al. | |
| 2007/0228157 A1 | 10/2007 | Eckert | |
| 2010/0197383 A1 | 8/2010 | Rader et al. | |
| 2012/0197743 A1 | 8/2012 | Grigg et al. | |
| 2012/0233071 A1 | 9/2012 | Winkelman, III et al. | |
| 2012/0239417 A1 | 9/2012 | Pourfallah et al. | |
| 2013/0080333 A1 | 3/2013 | Kamotskyy et al. | |
| 2013/0151360 A1 | 6/2013 | Scipioni et al. | |
| 2014/0136349 A1* | 5/2014 | Dave | G06Q 20/12 705/16 |

(Continued)

OTHER PUBLICATIONS

ProQuestDialog NPL Search History.*

*Primary Examiner* — John H. Holly
(74) *Attorney, Agent, or Firm* — Haynes and Boone, LLP

(57) ABSTRACT

Methods, systems, and computer program products for providing attribute-based card combinations for digital wallets are disclosed. A computer-implemented method may include associating a first asset with a digital wallet, associating a second asset with the digital wallet, receiving a request to determine a relationship between the first asset and the second asset in the digital wallet, determining the relationship between the first asset and the second asset in the digital wallet, creating the relationship between the first asset and the second asset in the digital wallet, notifying a user of the digital wallet about how a change to the first asset in the digital wallet is to affect the second asset in the digital wallet based on the relationship between the assets, and performing a transaction involving the digital wallet based on the relationship between the first asset and the second asset in the digital wallet.

20 Claims, 8 Drawing Sheets

(56) References Cited

U.S. PATENT DOCUMENTS

2014/0195425 A1\* 7/2014 Campos ............ G06Q 20/3674
705/41

\* cited by examiner

ATTRIBUTE-BASED CARD COMBINATIONS FOR DIGITAL WALLETS

CROSS-REFERENCE TO RELATED APPLICATIONS

This application is a continuation of U.S. patent application Ser. No. 14/581,642, filed Dec. 23, 2014 which is herein incorporated by reference in its entirety.

TECHNICAL FIELD

The present disclosure generally relates to electronic or digital wallets and, more particularly, to the management of attribute-based card combinations in digital wallet applications, computer systems, and devices.

BACKGROUND

A digital wallet generally refers to an electronic device or software application running on an electronic device that allows a user to store and manage digital versions of credit cards, debit cards, gift cards, identification cards, and other digital wallet assets. For example, a user can enter information about a physical card into a digital wallet software application to create a corresponding virtual digital wallet card asset. The user then may access and present the virtual card, for example, using a smart phone or other portable computing device without carrying around a wallet or the physical card itself.

While digital wallets have provided users with some added convenience, existing digital wallet software applications generally are limited to displaying renderings of physical cards. For example, digital wallet users may add, organize, rearrange, and replace virtualized cards in a digital wallet. However, existing digital wallets do little more than duplicate information that is already available to a user.

BRIEF DESCRIPTION OF THE DRAWINGS

Various examples of the present disclosure will be understood more fully from the detailed description given below and from the accompanying drawings of various examples of the disclosure. In the drawings, like reference numbers may indicate identical or functionally similar elements. The drawing in which an element first appears is generally indicated by the left-most digit in the corresponding reference number.

DETAILED DESCRIPTION

Systems, methods, and computer program products are disclosed for managing attribute-based card combinations in digital wallets.

In an example, a user adds assets to a digital wallet. For example, the user may add one or more credit cards, debit cards, gift cards, rewards cards, identification cards, and/or other assets to a digital wallet. In an example, a user then creates relationships between various assets in the digital wallet. For example, the user may associate a gift card with a credit card to reload the gift card using credit card funds automatically when a balance on the gift card falls below a predetermined threshold amount. Other relationships also may be created between the gift card and credit card or among other various assets in the digital wallet.

In an example, the relationship between the gift card and credit card is created and stored in the digital wallet or other data store. In addition, the relationship between the gift card and the credit card may be adjusted or modified by the user at any time. In an example, the digital wallet monitors digital wallet assets and corresponding relationships for changes and events. In one example, the digital wallet detects that a balance on the gift card has fallen below a predetermined threshold amount, examines the relationship between the gift card and credit card in response to the event, reloads the gift card using funds from the credit card based on the relationship, and notifies the digital wallet user. For example, the digital wallet automatically may perform the reload operation and then notify the digital wallet user, or first may seek the approval of the digital wallet user before performing the reload operation according to the relationship.

Accordingly, aspects of the present disclosure provide digital wallet users with novel digital wallet features to assist in the management and utilization of digital wallet assets.

Figure 1:
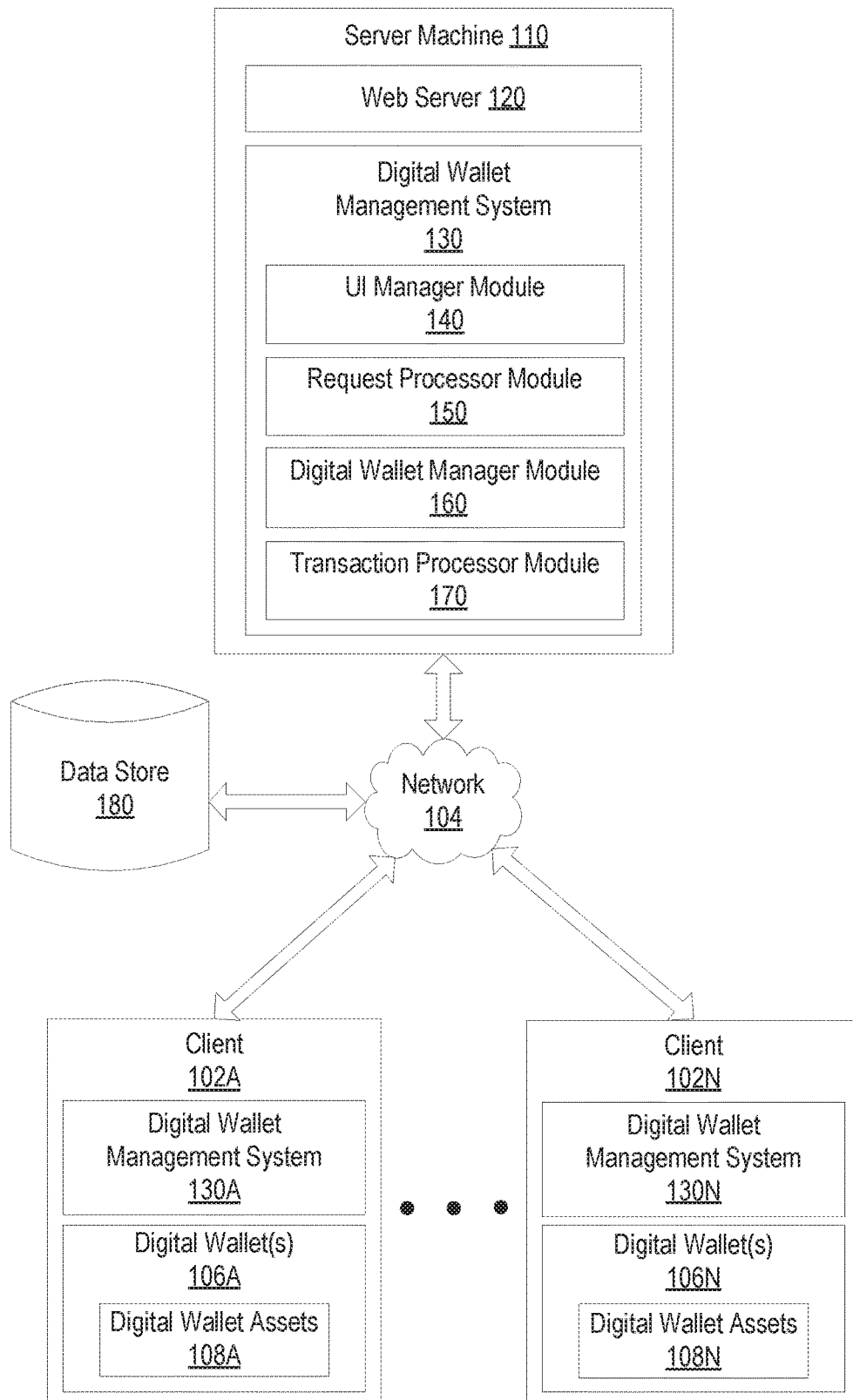
FIG. 1 is a block diagram illustrating a system architecture, in accordance with various examples of the present disclosure.

FIG. 1 illustrates an exemplary system architecture 100 in which examples of the present disclosure may be implemented. System architecture 100 includes a server machine 110, a data store 180, and client machines 102A-102N connected to a network 104. Network 104 may be a public network (e.g., the Internet), a private network (e.g., a local area network (LAN) or wide area network (WAN)), or a combination thereof. In an example, network 104 may include the Internet and/or one or more intranets, wired networks, wireless networks, and/or other appropriate types of communication networks. In one example, network 104 may comprise a wireless telecommunications network (e.g., cellular phone network) adapted to communicate with other communication networks, such as the Internet.

Data store 180 is persistent storage that is capable of storing various types of data, such as text, audio, video, and image content. In some examples, data store 180 might be a network-attached file server, while in other examples data store 180 might be some other type of persistent storage such as an object-oriented database, a relational database, and so forth.

Client machines 102A-102N may be personal computers (PC), laptops, mobile phones, tablet computers, server computers, wearable computing devices, or any other computing devices. Client machines 102A-102N may run an operating system (OS) that manages hardware and software of the client machines 102A-102N. A browser (not shown) may run on the client machines (e.g., on the OS of the client machines). The browser may be a web browser that can access content and services provided by a web server 120 of server machine 110. Other types of computer programs and computer scripts also may run on client machines 102A-102N.

Client machines 102A-102N each may include a respective digital wallet management system (130A, 130N), to manage one or more respective digital wallets (106A, 106N) and corresponding digital wallet assets (108A, 108N). Server machine 110 also may include a digital wallet management system 130 for managing a digital wallet 106A, 106N and digital wallet assets 108A, 108N stored on a client machine 102A, on stored server machine 110, or stored on another computing device.

A digital wallet 106A, 106N generally refers to an electronic device or computer software running on an electronic device that allows a user to manage various personal credentials, accounts, and other assets. Examples of digital wallet assets 108A, 108N may include, but are not limited to, one or more credit cards, debit cards, mobile payment accounts, money transfer accounts, loyalty cards, rewards cards, offers, coupons, advertisements, bank accounts, checking accounts, investment accounts, electronic marketplace accounts, driver's licenses, boating licenses, pilot licenses, professional licenses, passports, birth certificates, government issued identification cards, a marriage license, deeds to real property, deeds to personal property, car insurance identification, home insurance identification, automobile insurance identification, motorcycle insurance identification, umbrella or supplemental insurance identification, a green card, a permanent resident card, a voter registration card, an employer ID, a military ID, a club ID, a fitness membership ID, a public transit card, a roadside assistance membership, a medical insurance card, a vision insurance card, a dental insurance card, etc. In some examples, digital wallet assets 108A, 108N may be associated with one or more digital wallet(s) 106A, 108N on a single client machine 102A or on different client machines 102A-102N (e.g., joint accounts, a marriage license, etc.).

In an example, each digital wallet asset 108A has identifying information and one or more other attributes. Such attributes may include textual data, numeric data, alphanumeric data, images, videos, sounds, encrypted data, unencrypted data, etc. Digital wallet assets 108A may share attribute data (e.g., a residential address, a shipping address, a photo ID, etc.) between one another. In addition, corresponding or unrelated digital wallet asset 108A attributes may be associated as part of relationship.

In an example, each digital wallet asset type generally has one or more associated events or activities that can occur or be performed. For example, a credit card can be used to purchase goods or serve as a funding source for debit card, store card, or rewards card. Digital wallet assets 108A also may have events, such as expiration, renewal, and other activities, etc. Events and activities associated with digital wallet asset types may be used alone or in combination with attributes to create relationships between digital wallet assets (e.g., automated reloading of a debit card from one or more available sources of funding).

Figure 2:
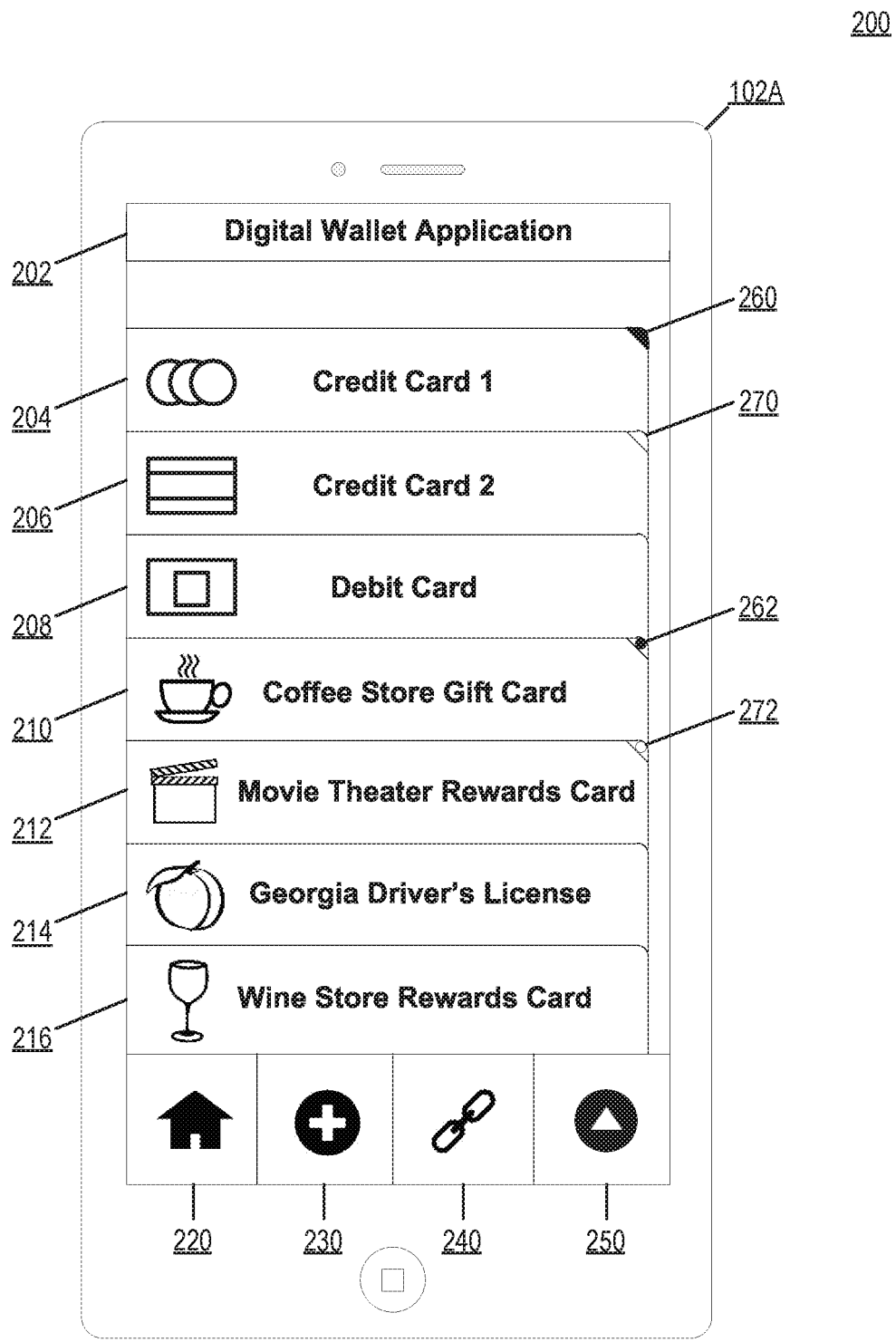
FIG. 2 is a diagram illustrating an example software application providing attribute-based card combination relationships for a digital wallet, in accordance with various examples of the present disclosure.

FIG. 2 is a diagram 200 illustrating an example software application providing attribute-based card combination relationships for a digital wallet, in accordance with various examples of the present disclosure.

Diagram 200 includes an example client machine 102A running an instance of a digital wallet software application 202. Digital wallet software application 202 comprises a plurality of example digital wallet assets, including a first credit card 204, a second credit card 206, a debit card 208, a coffee store gift card 210, a movie theater rewards card 212, a driver's license 214, and a wine store rewards card 216. Digital wallet software application 202 also includes a plurality of example user interface controls including a home shortcut 220, a control to add a new digital wallet asset 230, a control to create a relationship between digital wallet assets 240, and a navigation control 250 to navigate within the digital wallet software application 202.

The first credit card 204 includes an example of a colored marker 260 of a first color and the coffee store gift card 210 includes an example of an associated colored marker 262 of the same color, which visually indicates a relationship between the digital wallet assets. Similarly, the second credit card 206 includes an example of a colored marker 270 of a second color and the movie theater rewards card 212 includes an example of an associated colored marker 272 of the second color to indicate a different relationship between those digital wallet assets. In some examples, one or more colors, sizes, and/or shapes may be used to indicate suggested relationships or actual created relationships between digital wallet assets.

With respect to FIG. 1, server machine 110 may be a rackmount server, a router computer, a personal computer, a portable digital assistant, a mobile phone, a laptop computer, a tablet computer, a camera, a video camera, a netbook, a desktop computer, a media center, or any combination thereof. Server machine 110 may include a web server 120 and a digital wallet management system 130. In some examples, web server 120 and digital wallet management system 130 may run on one or more different machines.

Web server 120 may provide text, audio, and video images from data store 180 to client machines 102A-102N. Web server 120 also may provide web-based application services, business logic, and/or digital wallet management system 130A, 130N updates to client machines 102A-102N. Client machines 102A-102N may locate, access, and consume various forms of content and services from web server 120 using applications, such as a web browser, web servers, application servers, computer programs, etc. Web server 120 also may receive text, audio, video, and image content from clients 102A-102N that is saved in data store 180 for purposes that may include preservation and distribution of content. Further, web server 120 and/or digital wallet management system 130 may receive API requests from various client machines 102A-102N.

In an example, web server 120 is coupled to one or more applications servers (not shown) that provide applications, services, and digital wallet management system 130 APIs to client machines 102A-102N. For example, web server 120 may provide clients 102A-102N with access to one or more application services of a digital wallet management system 130. Such functionality also may be provided, for example, as one or more different web applications, standalone applications, systems, plug-ins, web browser extensions, and application programming interfaces (APIs). In some examples, plug-ins and extensions also may be referred to, individually or collectively, as "add-ons."

In an example, some client machines 102A-102N may include applications associated with a service provided by server machine 110. In one example, one or more device types (e.g., smart phones, smart televisions, tablet computers, wearable devices, smart home computer systems, etc.) may use applications to access content provided by, to issue commands to server machine 110, and/or to receive content from server machine 110 without visiting or using web pages.

In an example, functions performed by server machine 110 and/or web server 120 also may be performed by the client machines 102A-102N, in whole or in part. In addition, the functionality attributed to a particular component may be performed by different or multiple components operating together. Server machine 110 may be accessed as a service provided to other systems or devices via appropriate application programming interfaces (APIs), and thus is not limited to use with websites.

In an example, a digital wallet management system 130, 130A, 130N may include a user interface (UI) management module 140, a request processor module 150, a digital wallet management module 160, and a transaction processor module 170. In some examples, functionality associated with UI management module 140, request processor module 150, digital wallet management module 160, and transaction processor module 170 may be combined, divided, and organized in various arrangements on one or more computing devices.

In an example, user interface (UI) management module 140 of digital wallet management system 130 enables a user of a client machine 102A to manage digital wallet assets graphically in a digital wallet software application 202. For example, UI management module 140 may provide a user of the digital wallet software application 202 with various screens and graphical components that allow the user to add digital wallet assets 108A to a digital wallet 106A, to input digital wallet asset 108A data, to update digital wallet asset 108A data, to remove digital wallet assets 108A from a digital wallet 106A, to create attribute-based relationships between digital wallet assets 108A, to create event or activity-based relationships between digital wallet assets 108A, and/or to perform various user interface gestures to streamline digital wallet 106A management.

In an example, user interface (UI) management module 140 provides a user of a digital wallet software application 202 with one or more visual cues or markers indicating relationships between digital wallet assets 108A. For example, UI management module 140 may mark a first asset and a second asset in a digital wallet 106A with a common color(s), or common-colored visual marker(s) to indicate a determined or created relationship between digital wallet assets 108A. Further, UI management module 140 may use various shapes and/or icons of various sizes and colors to represent and/or symbolize information about a determined or created relationship between digital wallet assets 108A. For example, a first colored shape may indicate a primary, independent, or source asset in a relationship between digital wallet assets 108A while a different shape having the same color may indicate a secondary, dependent, or recipient digital wallet asset in the relationship.

In an example, user interface (UI) management module 140 provides a user of digital wallet software application 202 with a map of digital wallet asset 108A relationships. For example, UI management module 140 may generate and present a separate display that graphically links digital wallet assets using lines and/or arrows. In one example, a graphical mapping of digital wallet asset 108A relationships in a digital wallet 106A may include translucent tethers or other types of lines joining digital wallet assets 108A, which may light up or visually change when a user hovers, presses, or otherwise interacts with any of the associated digital wallet assets 108A.

In an example, request processor module 150 of digital wallet management system 130 receives various server machine 110, web server 120, application server, and/or client machine 102A-102N requests. For example, request processor module 150 may receive requests from a user of a client machine 102A to add various digital wallet assets 108A to a digital wallet 106A. Request processor module 150 also may receive user requests to manage a digital wallet 106A and various digital wallet assets 108A. Further, request processor module 150 may receive requests to create and maintain various relationships between digital wallet assets 108A in a digital wallet 106A.

In an example, digital wallet management module 160 of digital wallet management system 130 assists a digital wallet software application 202 user in managing digital wallet assets 108A. For example, a digital wallet management module 160 may add, modify, arrange, organize, and/or remove digital wallet assets 108A with respect to one or more digital wallet(s) 106A.

In an example, digital wallet management module 160 determines one or more relationships (e.g., an actual relationship, a determined relationship, a suggested relationship, etc.) involving new or existing digital wallet assets 108A and presents the relationships determined for the digital wallet assets 108A to a user of a digital wallet software application 202. For example, digital wallet management module 160 may determine suggested relationships between digital wallet assets 108A based on attributes shared by the digital wallet assets 108A, corresponding attributes of the digital wallet assets 108A, and/or events and activities associated with the digital wallet assets 108A.

In an example, digital wallet management module 160 creates one or more relationships between digital wallet assets 108A. For example, digital wallet management module 160 may determine a suggested relationship between digital wallet assets 108A automatically without user confirmation or user input, create a determined relationship between digital wallet assets 108A after receiving user confirmation or user input, and/or create a user-defined relationship between digital wallet assets 108A. Digital wallet management module 160 also may adjust, modify, and/or remove relationships between digital wallet assets 108A.

In an example, digital wallet management module 160 monitors digital wallet assets 108A and relationships between digital wallet assets 108A. In an example, digital wallet management module 160 detects an event or modification affecting one or more digital wallet assets 108A and/or digital wallet asset 108A relationships. For example, digital wallet management module 160 may examine one or more digital wallet assets 108A and/or digital wallet asset 108A relationships in response to an event or modification involving at least one digital wallet asset 108A. Digital wallet management module 160 also may perform one or more activities in response to an event or modification involving one or more digital wallet assets 108A and/or digital wallet asset 108A relationships. In one example, digital wallet management module 160 may notify a digital wallet user about how a modification to a digital wallet asset 108A or an event involving a digital wallet asset 108A is to affect another digital wallet asset 108A based on an actual, determined, or suggested relationship between digital wallet assets 108A.

In an example, transaction processor module 170 of digital wallet management system 130 performs a transaction involving a digital wallet 106A using one or more relationships between digital wallet assets 108A. In one example, transaction processor module 170 automatically transfers funds between digital wallet assets 108A according to a relationship between the digital wallet assets 108A. For example, a debit card may be reloaded automatically using a credit card when the balance of the debit card is detected to be below a predetermined amount as indicated by a relationship between the debit card and credit card in a digital wallet 106A.

In an example, transaction processor module 170 applies resources from two or more digital wallet assets 108A when paying for a purchase based on a sequential, ordered, or ranked payment resource relationship created between multiple digital wallet assets 108A. For example, transaction processor module 170 first may use funds from one or more gift cards, before using funds from one or more debit cards, and before using funds from one or more credit cards when paying for a purchase based on a relationship between such digital wallet assets 108A.

Figure 3:
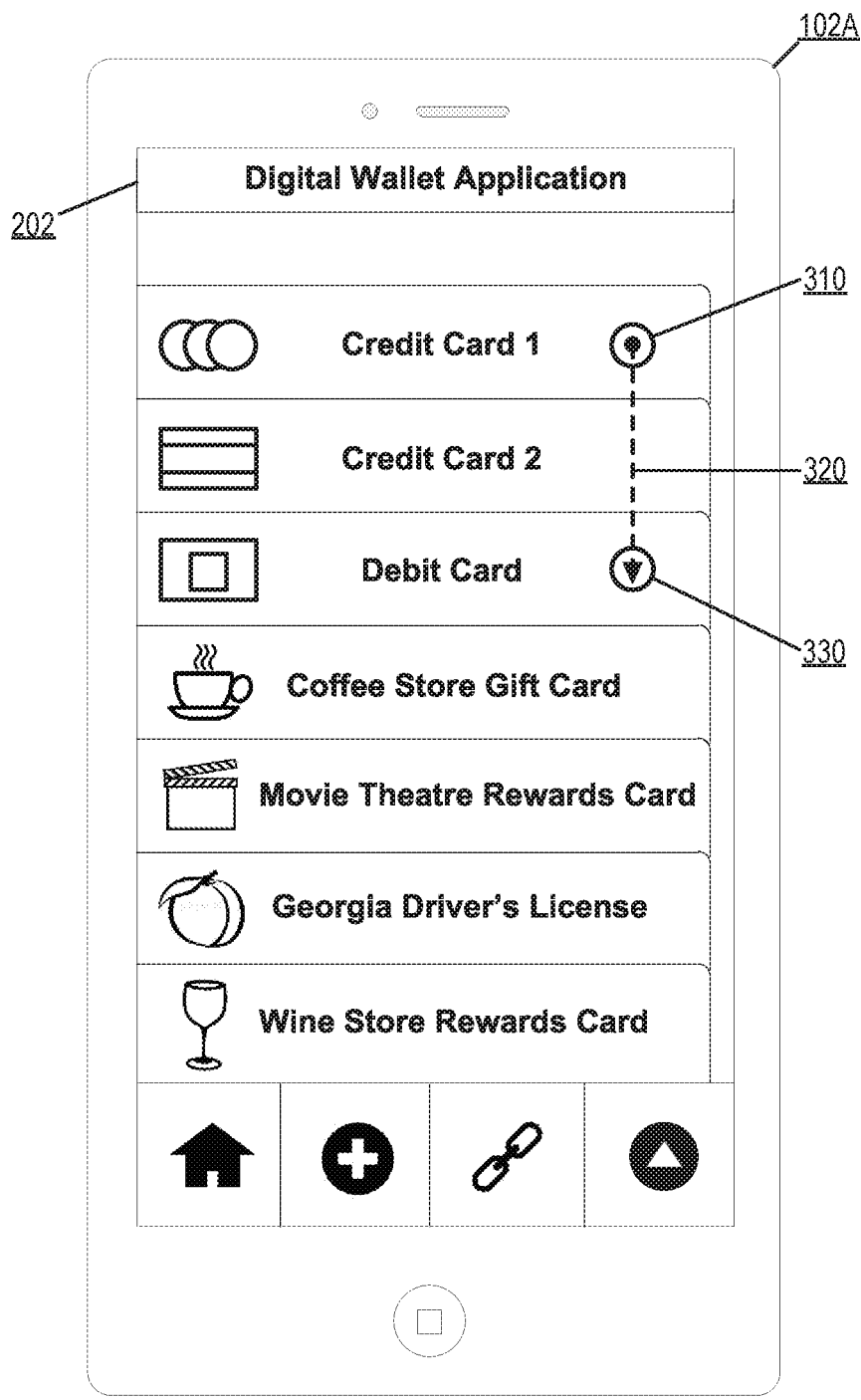
FIG. 3 is a diagram illustrating a first example graphical user interface gesture for creating a relationship between assets in a digital wallet software application, in accordance with various examples of the present disclosure.

FIG. 3 is a diagram 300 illustrating a first example graphical user interface gesture for creating a relationship between assets in a digital wallet software application 202, in accordance with various examples of the present disclosure. In an example, a user of a client 102A device performs a graphical user interface gesture when interacting with a digital wallet software application 202 to create a relationship between assets digital wallet.

In an example, the user presses and holds a first asset in the digital wallet 310 to select the first asset in the digital wallet 106A. The user continues by dragging or moving the first asset to a second asset in the digital wallet 320 and then releases or drops the first asset onto the second asset 330 indicating the user wishes to create a relationship between the digital wallet assets 108A. In one example, the user performs the gesture to create a suggested relationship between digital wallet assets 108A determined by a digital wallet manager module 130.

In an example, user interface (UI) manager module 140 of digital wallet management system 130 detects the user interface gesture to create a relationship between digital wallet assets 108A. In one example, UI manager module 140 displays one or more dialogues, screens, or setup wizards to assist the user in creating a relationship between digital wallet assets. In some examples, the order and direction in which a user associates different assets in a digital wallet may indicate a flow of funding. For example, in the example above, the direction of the gesture may indicate that the first asset (i.e., Credit Card 1) is to reload or provide financial resources for the second asset (i.e., Debit Card).

Figure 4:
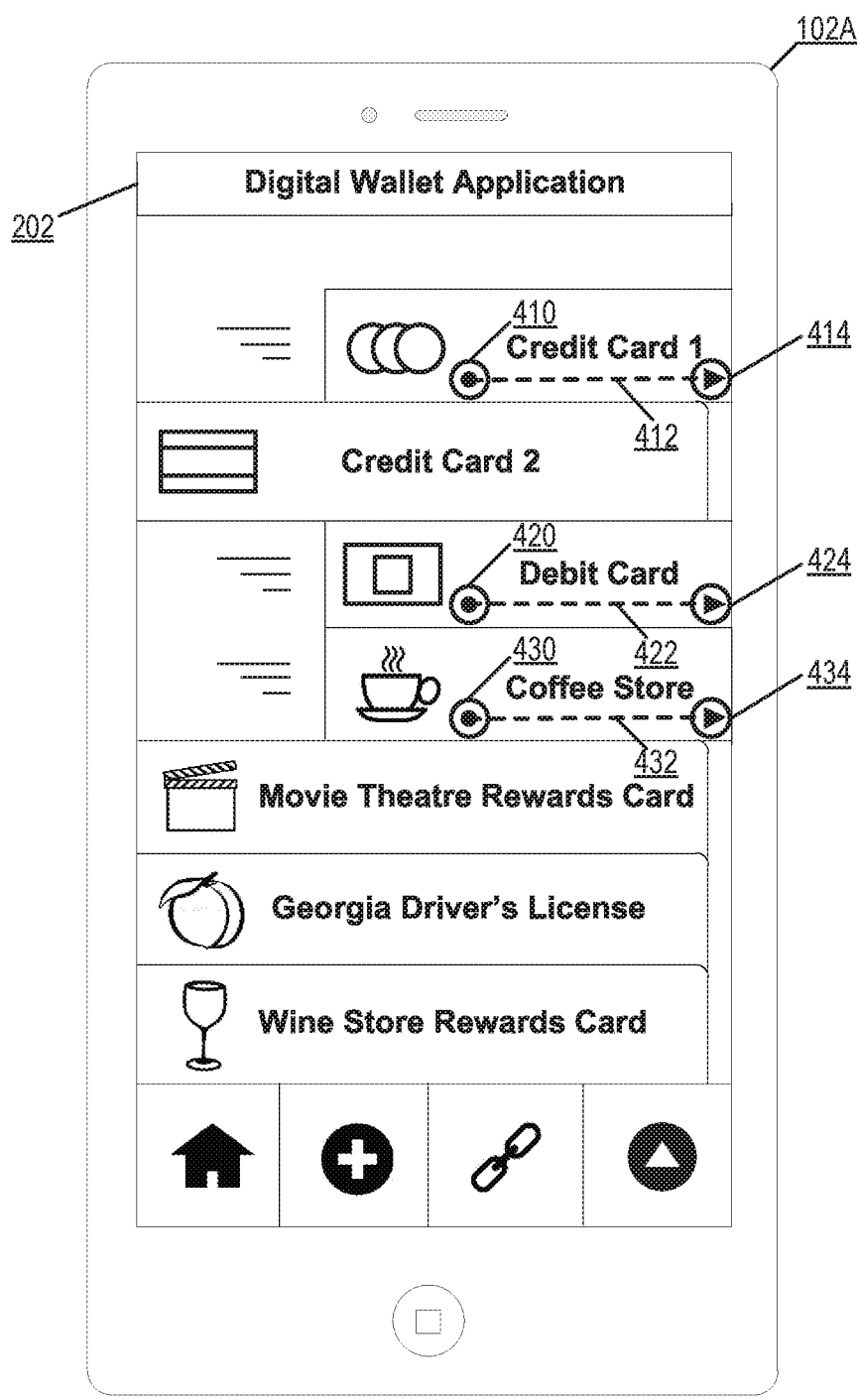
FIG. 4 is a diagram illustrating a second example graphical user interface gesture for creating a relationship between assets in a digital wallet software application, in accordance with various examples of the present disclosure.

FIG. 4 is a diagram 400 illustrating a second example graphical user interface gesture for creating a relationship between assets in a digital wallet software application, in accordance with various examples of the present disclosure. In an example, a user of a client 102A device performs a "multi-touch card combination" graphical user interface gesture when interacting with a digital wallet software application 202 to create a relationship between two or more digital wallet assets at the same time.

In an example, the user selects or presses and holds a first digital wallet asset 410, a second digital wallet asset 420, and a third digital wallet asset 430 either simultaneously or in sequence. For example, the user may place a first finger (e.g., a ring finger) on the first digital wallet asset 410, a second finger (e.g., a middle finger) on the second digital wallet asset 420, and a third finger (e.g., an index finger) on the third digital wallet asset 430 when performing the gesture. In some examples, the user may select up to five digital wallet assets, one digital wallet asset per finger.

In other examples, the user may first touch or select the first digital wallet asset 410, then touch for select the second digital wallet asset 420, and then touch or select the third digital wallet asset 430 in sequence. For example, digital wallet software application 202 may allow the user to select any number of digital wallet assets in sequence using the same finger, different fingers, a pointer, a stylus, etc., without having to hold each digital wallet asset to maintain digital wallet asset selections.

Continuing with the example above, the user then continues the user interface gesture by simultaneously sliding or swiping the first digital wallet asset selected using the first finger (e.g., the ring finger) 412, sliding or swiping the second digital wallet asset selected using the second finger (e.g., the middle finger) 422, and sliding or swiping the third digital wallet asset selected using the third finger (e.g., the index finger) 432 in the same direction at the same time. The user then completes the user interface gesture for creating a relationship between the selected digital wallet assets by releasing the first finger at a different location 414 after swipe 412, releasing the second finger at a different location 424 after swipe 422, and releasing the third finger at different location 434 after swipe 432, for example, at the same time or within a close proximity of time (e.g., within a second). In one example, the user performs the gesture to create a suggested relationship between digital wallet assets 108A determined by a digital wallet manager module 130.

In an example, user interface (UI) manager module 140 of digital wallet management system 130 detects the user interface gesture performed by the user as described above to create relationships between two or more digital wallet assets at one time. In one example, UI manager module 140 responds by displaying one or more dialogues, screens, or setup wizards to assist the user in creating a relationship between the digital wallet assets.

Figure 5:
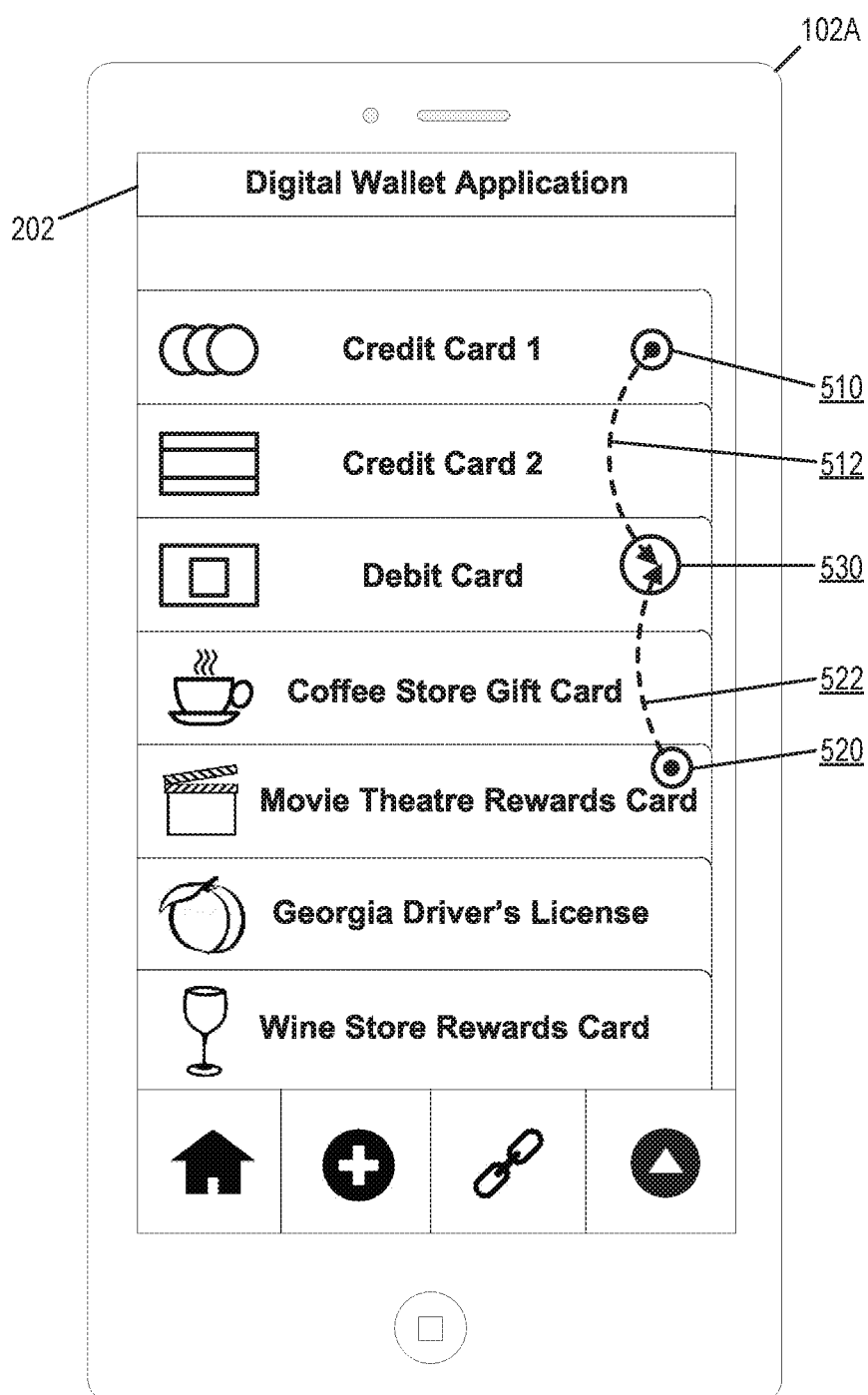
FIG. 5 is a diagram illustrating a third example graphical user interface gesture for creating a relationship between assets in a digital wallet software application, in accordance with various examples of the present disclosure.

FIG. 5 is a diagram 500 illustrating a third example graphical user interface gesture for creating a relationship between assets in a digital wallet software application, in accordance with various examples of the present disclosure. In an example, a user of a client 102A device performs a graphical user interface "pinch" or "squeeze" gesture when interacting with a digital wallet software application 202 to create a relationship between digital wallet assets.

In an example, the user selects or presses and holds a first digital wallet asset 510 and a second digital wallet asset 520, either simultaneously or in sequence. For example, the user may place a first finger (e.g., an index finger) on the first digital wallet asset 510 and a second finger (e.g., a thumb) on the second digital wallet asset 520. The user then continues the gesture by simultaneously sliding or swiping in first digital wallet asset selected using the first finger (e.g., the index finger) in one direction 512 and sliding or swiping the second digital wallet asset selected using the second finger (e.g., the thumb) in an opposite direction 522 until the two fingers meet or enter a common area 530. The user then may hold the first finger and the second finger in the common area 530 for a predetermined period of time or release the fingers from the common area 530 to create a relationship between the first and second assets in the digital wallet software application 202.

In an example, user interface (UI) manager module 140 of a digital wallet management system 130 detects a "pinch" or "squeeze" user interface gesture performed by the user as described above to create relationships between digital wallet assets. In one example, UI manager module 140 responds by displaying one or more dialogues, screens, or setup wizards to assist the user in creating a relationship between the digital wallet assets.

Figure 6:
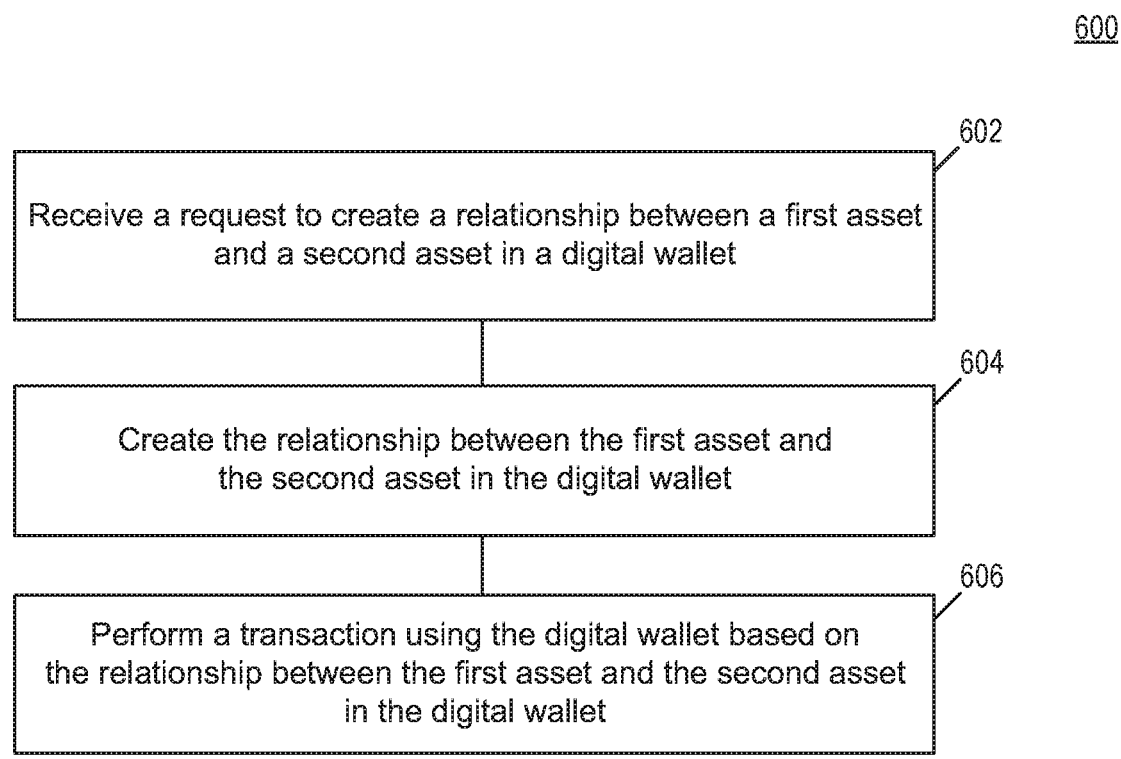
FIG. 6 is a flow diagram for creating an attribute-based card combination relationship between assets in a digital wallet, according to an example of the present disclosure.

FIG. 6 is a flow diagram for creating an attribute-based card combination relationship between assets in a digital wallet, according to an example of the present disclosure. The method 600 may be performed by processing logic that may comprise hardware (circuitry, dedicated logic, programmable logic, microcode, etc.), software (such as instructions run on a general purpose computer system, dedicated machine, or processing device), firmware, or a combination thereof.

Method 600 begins at block 602 when request processor module 150 of digital wallet management system 130 receives a request to create a relationship between two or more assets in a digital wallet. In an example, request processor model 150 receives a request to create a relationship between digital wallet assets 108A from a user of a digital wallet software application 202. In some examples, a user interface (UI) manager module 140 of a digital wallet management system 130 generates a request to create a relationship between digital wallet assets 108A based on user input or instructions.

In an example, request processor module 150 receives a request to create a relationship between two or more assets digital wallet 106A. For example, a user may request that a reload relationship be created between a gift card and a credit card in a digital wallet 106A, so that the gift card is reloaded with funds from the credit card periodically (e.g., weekly, monthly, semiannually, etc.) and/or when a balance of gift card falls below a predetermined threshold. In one example, a user requests the creation of a relationship between a funding source (e.g., credit card, debit card, savings account, checking account, etc.) and a digital wallet asset 108A associated with a rental account (e.g., library card, a video rental card, etc.) to automatically pay current and/or future late fees on the rental account with the associated funding source. Request processor module 150 also may adjust relationships between digital wallet assets based on user input or information obtained from one or more external sources (e.g., credit card provider, financial institution, government agency, etc.)

In an example, request processor module 150 receives a request to associate a credit card, a store membership card, and a photo identification card in a digital wallet 106A. For example, a user may wish to use a particular credit card and to receive merchant benefits from a store membership card when shopping at a particular store. Further, photo identification may be periodically or regularly required to complete a transaction. For example, a cashier may ask for photo identification occasionally for general credit card purchases or may be required by law to view photo identification for purchases of alcohol, tobacco and other regulated products and services.

In an example, a relationship between a credit card, store membership card and a photo identification card automatically causes a specific credit card and store membership card to be used for purchases with a merchant or automatically causes the credit card to be used when the store membership card is used. Further, the relationship automatically causes the presentation of a photo identification card for verification during such transactions, for example, automatically, based on a user response to a prompt, or on demand.

In an example, a user requests the creation of multiple relationships between an auto insurance card and a driver's license in a digital wallet 106A. In one example, a user requests that a driver's license be presented with an automobile insurance card either automatically or on demand (e.g., for a possible future traffic stop). The user further requests automatic reminders to update the auto insurance card when the driver's license is replaced with a driver's license from another state, for example, in accordance with appropriate laws of the new state, or when an address change is recorded. In one example, a user creates a relationship between a driver's license and a payment source (e.g., credit card, debit card, etc.) to automatically submit and pay for periodic driver's license renewal, to automatically submit and pay for annual registration, or to automatically pay fines or other fees.

In some examples, a user also may request the creation of a relationship between a driver's license and one or more other digital wallet assets 108A (e.g., a boating license, a pilot's license, a professional license, a voter registration card, organ donor card, etc.) so that the user is reminded to check and update associated assets in the relationship when at least one of the assets is replaced with a similar asset from a different state or other jurisdiction.

At block 604, digital wallet management module 160 of digital wallet management system 130 creates a relationship between a first asset and a second asset in the digital wallet. For example, digital wallet management module 160 may create one or more relationships between various digital wallet assets 108A.

In an example, digital wallet management module 160 creates a relationship between digital wallet assets 108A automatically without user input or confirmation. For example, digital wallet management module 160 may create a relationship between digital wallet assets 108A automatically based on a user preference, a default system setting, or based on previous activity of the user. In one example, digital wallet management module 160 determines and presents a relationship between digital wallet assets 108A to a user, which then may be created after digital wallet management module 160 receives user input or confirmation. Digital wallet management module 160 also may create custom, user-defined relationships between digital wallet assets 108A. Further, digital wallet management module 160 may adjust, modify, and/or remove digital wallet asset 108A relationships automatically or based on user request.

At block 606, transaction processor module 170 of digital wallet management system 130 performs a transaction using the digital wallet 106A based on a relationship maintained between the first asset and the second asset in the digital wallet 106A. In an example, transaction processor module 170 performs a financial transaction using a digital wallet 106A. For example, transaction processor module 170 may use a payment instrument (e.g., credit card, debit card, etc.) associated with a second digital wallet asset 108A (e.g., a store card, gift card, reports card, etc.) based on a relationship between the digital wallet assets 108A when the second digital wallet asset 108 is presented or used during a purchase.

In an example, transaction processor module 170 may automatically reload a debit card or other digital wallet asset 108A capable of receiving funds using resources from a source digital wallet asset 108A capable of providing funds based on a relationship between the digital wallet assets 108A. In one example, transaction processor module 170 performs a payment transaction using one or more digital wallet asset 108A fund sources based on a sequential, ordered, or ranked payment structure as defined in a relationship between the digital wallet assets 108A. For example, transaction processor module 170 may first exhaust one or more store gift cards as a payment resource prior to using one or more store debit cards and then may exhaust the debit cards before using one or more credit cards when completing one or more purchases.

Figure 7:
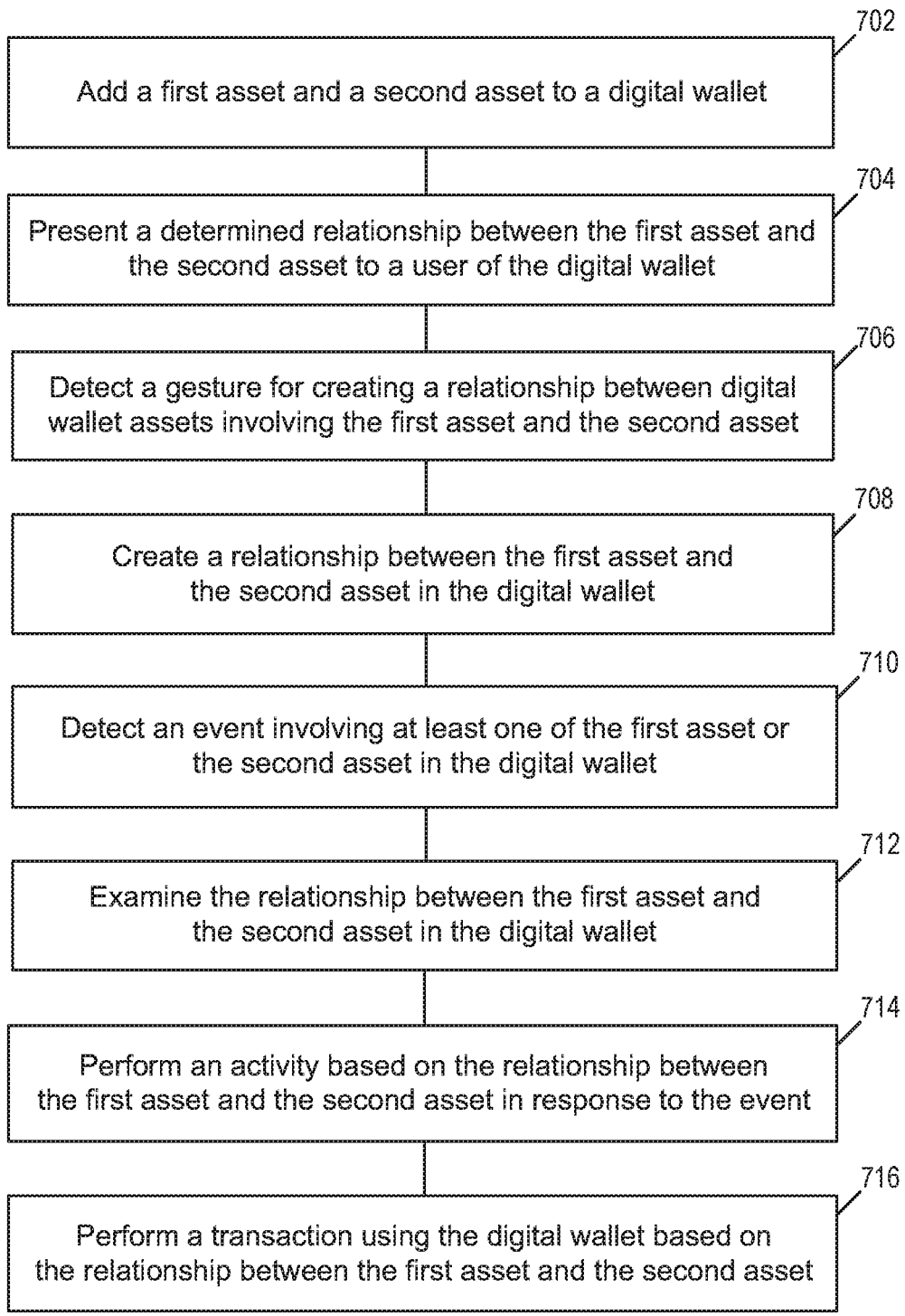
FIG. 7 is a flow diagram for maintaining an attribute-based card combination relationship between assets in a digital wallet, according to an example of the present disclosure.

FIG. 7 is a flow diagram for maintaining an attribute-based card combination relationship between assets in a digital wallet, according to an example of the present disclosure. The method 700 may be performed by processing logic that may comprise hardware (circuitry, dedicated logic, programmable logic, microcode, etc.), software (such as instructions run on a general purpose computer system, dedicated machine, or processing device), firmware, or a combination thereof.

Method 700 begins at block 702 when a user operating a digital wallet software application 202 running on a client machine 102A adds various digital wallet assets 108A to a digital wallet 106A. In an example, a user may download a digital wallet software application 202 onto a client machine 102A (e.g., a smartphone, a "smart watch," etc.). In some examples, a user may access one or more of a digital wallet software application 202, a digital wallet management system 130, a digital wallet, and digital wallet assets stored or maintained on a remote server (e.g. server machine 110 or another server).

In an example, a user may add various digital wallet assets 108A to a digital wallet 106A using a digital wallet management system 130A. For example, a user may enter information and attributes about each digital wallet asset 108A manually. A user also may download information and attributes about a digital wallet asset from another source, such as a provider of a respective asset. In some examples, a user may capture and upload a photographic representation of a credit card or other asset type to add a digital wallet asset 108A to a digital wallet 106A.

At block 704, user interface (UI) management module 140 presents a determined relationship between the first asset and second asset to a user of the digital wallet 106A. In an example, UI management module 140 presents one or more dialog boxes or screens to a user that include information about digital wallet assets 108A, one or more predetermined ways to associate digital wallet assets 108A in a relationship, and/or one or more suggested ways for the user to create a relationship between digital wallet assets 108A.

In an example, digital wallet management module 160 determines one or more suggested relationships for new and/or existing digital wallet assets 108A to present to a user. For example, digital wallet management module 160 may determine suggested relationships between digital wallet assets 108A based on attributes shared between the digital wallet assets 108A (e.g., residential address, shipping address, work address, etc.), corresponding attributes of the digital wallet assets 108A (e.g., attributes relating to a common state or jurisdiction), and/or compatible events and/or activities associated with the digital wallet assets 108A (e.g., a funding source asset being compatible with an asset capable of receiving and holding funds.). User interface (UI) management module 140 then presents the suggested relationships determined for the digital wallet assets 108A to a user of a digital wallet software application 202 for consideration. In one example, UI management module 140 indicates suggested relationships determined for digital wallet assets 108A using one or more colored shapes, markers, and/or other indications.

At block 706, user interface (UI) management module 140 detects a gesture for creating a relationship between digital wallet assets 108A that involves the first asset and the second asset in the digital wallet 106A. In an example, UI management module 140 detects a user interface gesture performed by a user of a digital wallet software application 202 indicating the user wishes to create a relationship between two or more digital wallet assets 108A. For example, UI management module 140 may detect a user interface gesture for creating a relationship between digital wallet assets 108A as described above with respect to diagram 300 of FIG. 3, diagram 400 of FIG. 4, and diagram 500 of FIG. 5, or other similar graphical user interface gestures for creating relationships between digital wallet assets 108A.

At block 708, digital wallet management module 160 creates a relationship between the first asset and the second asset in the digital wallet 106A. In an example, digital wallet management module 160 creates one or more relationships between digital wallet assets 108A. For example, digital wallet management module 160 may create one or more relationships between various combinations of digital wallet assets 108A in a digital wallet 106A. In an example, digital wallet management module creates a relationship between digital wallet assets 108A involved in a user interface gesture performed by a user.

In an example, digital wallet management module 160 automatically creates a determined relationship between digital wallet assets 108A without user confirmation or input, creates a determined relationship between digital wallet assets 108A suggested to a user after receiving affirmative confirmation from the user, and/or creates a custom, user-defined or user-initiated relationship between digital wallet assets 108A. Digital wallet management module 160 also may adjust, modify, and/or remove relationships between digital wallet assets 108A automatically or based on user input. Digital wallet management module 160 may create and maintain a relationship between digital wallet assets 108A in a corresponding digital wallet 106A or other data store 180.

In an example, digital wallet management module 160 determines from a credit card provider that a credit card in a digital wallet 106A provides points, rewards, and/or benefits for school-related purchases. In addition, digital wallet management module 160 determines from government or otherwise publicly available information that a state associated with a user driver's license in the digital wallet 106A has one or more tax holidays for back-to-school items. 160. In response, digital wallet management module 160 determines to suggest one or more determined relationships between the credit card and the driver's license to the user, for example, to remind the user of the tax holiday(s), to remind the user to use the particular credit card on the tax holiday, and/or to automatically use the credit card when the user purchases school-related items on the tax holiday or otherwise.

At block 710, digital wallet management module 160 detects an event involving the first asset or the second asset in the digital wallet. In an example, digital wallet management module 160 monitors digital wallet assets 108A and relationships created between digital wallet assets 108A. In one example, digital wallet management module 160 monitors and detects when digital wallet asset 108A information updates, attribute updates, status changes, events, and activities occur. For example, digital wallet management module 160 may detect when a digital wallet asset 108A as a low balance, is about to expire, has expired, has been locked, has been used, and/or is associated with one or more notifications.

At block 712, digital wallet management module 160 examines the relationship between the first asset and the second asset in the digital wallet. In an example, digital wallet management module 160 may examine one or more digital wallet assets 108A and/or digital wallet asset 108A relationships in response to an event or a modification involving at least one digital wallet asset 108A.

In an example, digital wallet management module 160 detects that a credit card in a digital wallet 106A is to expire in less than a month. In response to detecting the upcoming credit card expiration, digital wallet management module 160 examines each relationship involving the soon-to-expire credit card and corresponding digital wallet assets 108A. For example, relationships may be created between the credit card and a gym membership to pay monthly dues, a transit authority pass to pay for tolls, a club membership to pay for member dues and other fees, etc. Digital wallet management module 160 then may determine whether to notify the user about a detected event, how to notify the user about the detected event, and/or how to respond to the detected event based on the relationship(s).

At block 714, digital wallet management module 160 performs an activity based on the relationship between the first asset and second asset in response to the event. In an example, digital wallet management module 160 performs one or more activities in response to an event or modification involving one or more digital wallet assets 108A and/or digital wallet asset 108A relationships. For example, digital wallet management module 160 may transfer funds between digital wallet assets 108A, update information associated with digital wallet assets 108A or relationships between digital wallet assets 108A, may change payment sources, may notify digital wallet 106A user of a detected event or modification, etc.

In an example, digital wallet management module 160 notifies a digital wallet user about how an event or modification involving a digital wallet asset 108A is to affect one or more other digital wallet assets 108A based on a relationship between the assets. For example, digital wallet management module 160 may notify a user that a credit card is about to expire and notify the user of other digital wallet assets 108A (e.g., gym membership, toll tag, club membership, etc.) having relationships with the soon-to-expire credit card. In one example, digital wallet management module 160 allows a user to substitute another payment source for a soon-to-expire or expired payment source as part of a notification. Digital wallet management module 160 also may substitute another payment source automatically and/or reminder the user one or more additional times, for example, before, when, and after the payment source has expired or is no longer valid.

At block 716, transaction processor module 170 performs a transaction using the relationship between the first asset and the second asset in the digital wallet. In an example, transaction processor module 170 performs a financial transaction using a digital wallet 106A based on a relationship between digital wallet assets. In one example, a relationship between multiple digital wallet asset 108A payment sources defines an order, sequence, and a ranking for how the payment sources are to be used when making a purchase or payment. For example, the relationship may define a primary payment source, secondary payment source, a tertiary payment source, etc. Thus, for example, transaction processor module 170 may use the third payment source when the first and second payment sources are exhausted and/or unavailable. Similarly, transaction processor module 170 would use the second payment source when the first payment source was exhausted and/or unavailable. In some examples, transaction processor module 170 applies multiple payment sources in a manner to maximize user benefits, such as rewards, points, discounts, etc.

Figure 8:
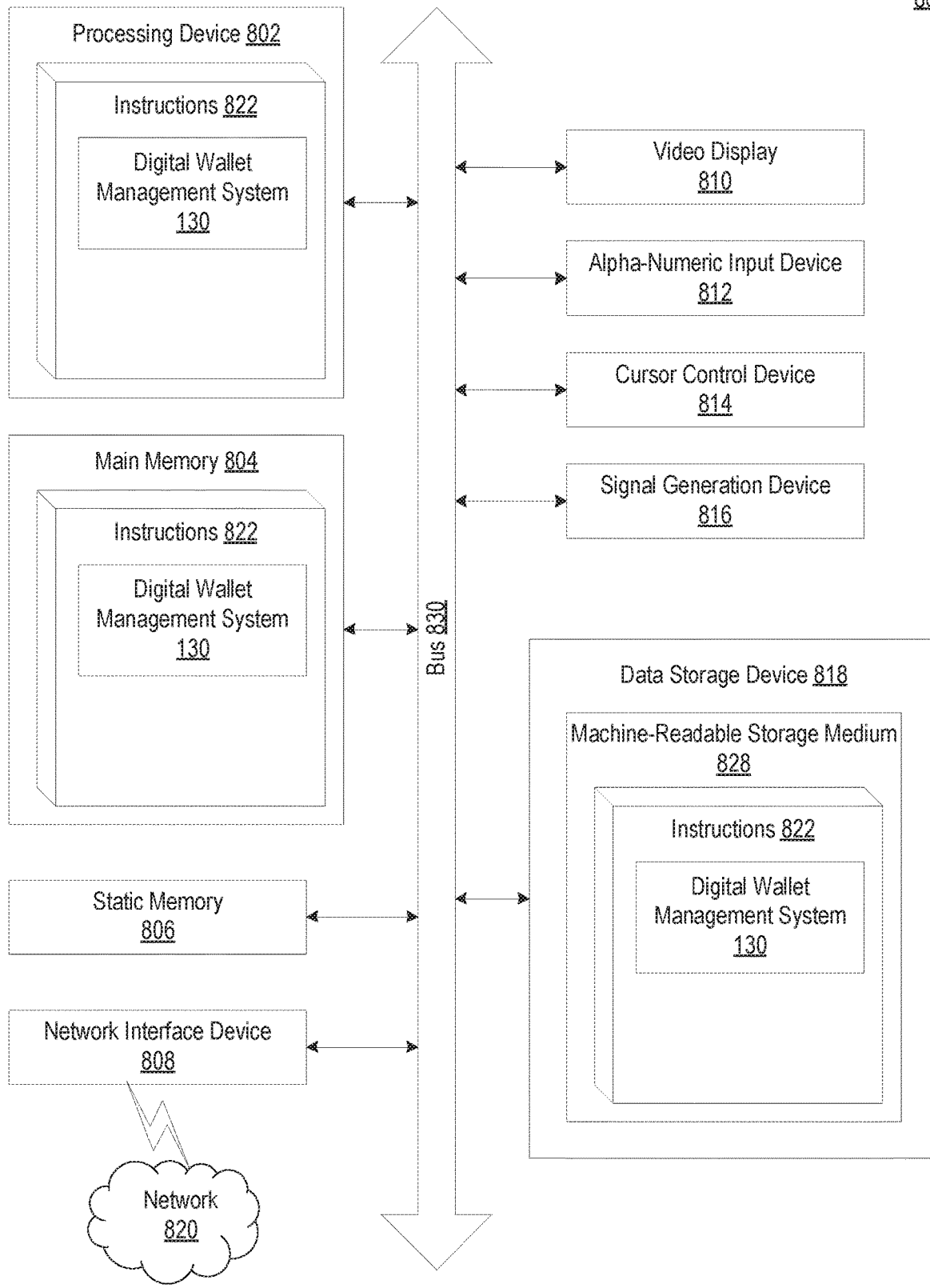
FIG. 8 is a block diagram of an exemplary computer system that may perform one or more of the operations described herein.

FIG. 8 illustrates a diagram of a machine in the exemplary form of a computer system 800, within which a set of instructions for causing the machine to perform any one or more of the methodologies discussed herein may be executed. In other examples, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a wearable computing device, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processing device (processor) 802, a main memory 804 (e.g., read-only memory (ROM), flash memory, dynamic random access memory (DRAM) such as synchronous DRAM (SDRAM), double data rate (DDR SDRAM), or DRAM (RDRAM), etc.), a static memory 806 (e.g., flash memory, static random access memory (SRAM), etc.), and a data storage device 818, which communicate with each other via a bus 830.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 802 also may be one or more special-purpose processing devices such as an application specific integrated circuit (ASIC), a field programmable gate array (FPGA), a digital signal processor (DSP), network processor, or the like. The processor 802 is configured to execute instructions 822 for performing the operations and steps discussed herein.

The computer system 800 also may include a network interface device 808. The computer system 800 may further include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a computer-readable storage medium 828 on which is stored one or more sets of instructions 822 (e.g., software computer instructions) embodying any one or more of the methodologies or functions described herein. The instructions 822 also may reside, completely or at least partially, within the main memory 804 and/or within the processor 802 during execution thereof by the computer system 800, the main memory 804 and the processor 802 also constituting computer-readable storage media. The instructions 822 may be transmitted or received over a network 820 via the network interface device 808.

In one example, the instructions 822 include instructions for one or more modules of a digital wallet management system (e.g., digital wallet management system 130 of FIG. 1) and/or a software library containing methods that call a digital wallet management system 130. While the computer-readable storage medium 828 (machine-readable storage medium) is shown as an example to be a single medium, the term "computer-readable storage medium" should be taken to include a single medium or multiple media (e.g., a centralized or distributed database, and/or associated caches and servers) that store the one or more sets of instructions. The term "computer-readable storage medium" also may include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Numerous details are set forth in the foregoing description. However, it will be apparent to one of ordinary skill in the art having the benefit of this disclosure that the present disclosure may be practiced without these specific details. In some instances, well-known structures and devices are shown in block diagram form, rather than in detail, to avoid obscuring the present disclosure.

Some portions of the detailed description have been presented in terms of algorithms and symbolic representations of operations on data bits within a computer memory. Here, an algorithm is generally conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "computing", "comparing", "associating", "applying", "transmitting", "receiving," "processing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other examples will be apparent to those of skill in the art upon reading and understanding the above description. The scope of the disclosure therefore should be determined with reference to the appended claims, along with the full scope of equivalents to which such claims are entitled.

What is claimed is:

1. A system comprising:
   a non-transitory memory; and
   one or more hardware processors coupled to the non-transitory memory and configured to read instructions from the non-transitory memory to cause the system to perform operations comprising:
      detecting a change to a first attribute of a first digital asset in a digital wallet application;
      determining a relationship between the first digital asset and a second digital asset in the digital wallet application based on attributes associated with the first and second digital assets;
      providing, on a user interface of the digital wallet application, a visual indication of the determined relationship between the first digital asset and the second digital asset;
      in response to detecting the change to the first attribute, modifying a second attribute of the second digital asset based on the determined relationship;
      transferring funds from the first digital asset to the second digital asset based on the determined relationship; and
      in response to receiving a purchase request, performing an electronic payment transaction based at least in part on the modified second attribute of the second digital asset and the funds transferred from the first digital asset to the second digital asset.

2. The system of claim 1, wherein the operations further comprise:
   detecting an event, wherein the funds are transferred from the first digital asset to the second digital asset in response to the detecting the event.

3. The system of claim 2, wherein the event indicates a balance of the second digital asset being below a threshold.

4. The system of claim 2, wherein the event indicates a purchase of a particular item using the second digital asset.

5. The system of claim 2, wherein the event indicates that the second digital asset is expiring within a predetermined amount of time.

6. The system of claim 2, wherein the operations further comprise providing a notification of the detected event on the user interface of the digital wallet application.

7. The system of claim 1, wherein the operations further comprise:
   determining one or more previous transactions that involve the first digital asset and the second digital asset, wherein the relationship between the first and second digital assets is determined based on the one or more previous transactions.

8. A method, comprising:
   receiving, from an interface of a digital wallet application, an input;
   changing a first attribute of a first digital asset based on the received input;

modifying, by one or more hardware processors associated with the digital wallet application, a second attribute of the second digital asset based on the changed first attribute of the first digital asset and a determined relationship between the first digital asset and the second digital asset;

transferring funds from the first digital asset to the second digital asset based on the determined relationship; and performing, by the one or more hardware processors, a transaction based at least in part on the modified second attribute of the second digital asset and at least a portion of the funds transferred from the first digital asset to the second digital asset.

9. The method of claim 8, wherein the first attribute comprises one of a residential address of a user of the digital wallet application, a shipping address of the user, or an identification card associated with the user.

10. The method of claim 8, wherein the input is a user input received via a user interface of the digital wallet application.

11. The method of claim 8, wherein the input is received from an external server.

12. The method of claim 8, wherein the transaction is performed using a tiered combination of the first and second digital assets.

13. The method of claim 8, further comprising:
determining the relationship between the first and second digital assets based at least in part on attributes of the first and second digital assets.

14. The method of claim 13, further comprising:
presenting, on a user interface of the digital wallet application, the determined relationship between the first and second digital assets;
receiving, via the user interface, a user input; and
adjusting the relationship based on the user input.

15. A non-transitory machine-readable medium having stored thereon machine-readable instructions executable to cause a machine to perform operations comprising:
determining a relationship between a first digital asset and a second digital asset in the digital wallet application;
providing, on a user interface of the digital wallet application, a visual indication of the determined relationship between the first digital asset and the second digital asset;
modifying an attribute of the second digital asset based on a changed attribute of the first digital asset;
transferring funds from the first digital asset to the second digital asset based on the determined relationship; and
performing a transaction based at least in part on the modified second attribute of the second digital asset and at least a portion of the funds transferred from the first digital asset to the second digital asset.

16. The non-transitory machine-readable medium of claim 15, wherein the operations further comprise:
accessing one or more transactions performed using the first digital asset and the second digital asset, wherein the relationship between the first digital asset and the second digital asset is determined based on the one or more transactions.

17. The non-transitory machine-readable medium of claim 16, wherein the funds are the first funds, and wherein the one or more transactions comprise a transaction of transferring second funds from the first digital asset to the second digital asset.

18. The non-transitory machine-readable medium of claim 17, wherein the operations further comprise determining the first funds based at least in part on the second funds used in the one or more transactions.

19. The non-transitory machine-readable medium of claim 16, wherein the one or more transactions comprise a transaction that uses funds from both the first digital asset and the second digital asset.

20. The non-transitory machine-readable medium of claim 15, wherein the operations further comprise:
detecting, via the user interface of the digital wallet application, a user gesture; and
modifying the relationship between the first and second digital assets based on the user gesture.

\* \* \* \* \*